Nov. 30, 1937.  J. V. CAPUTO  2,100,503
MANUFACTURE OF PIPE BLANKS
Original Filed Feb. 11, 1935   14 Sheets-Sheet 2
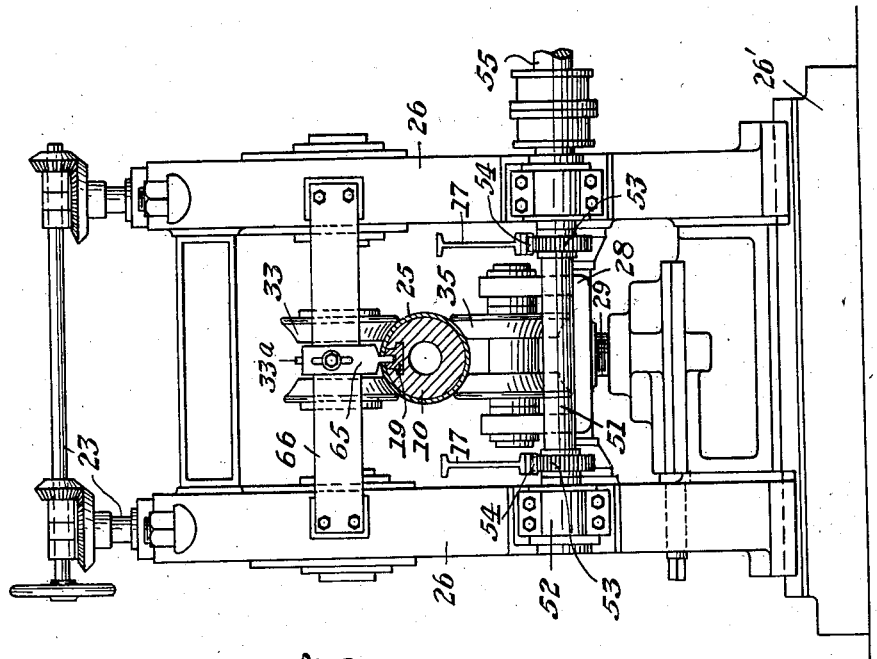
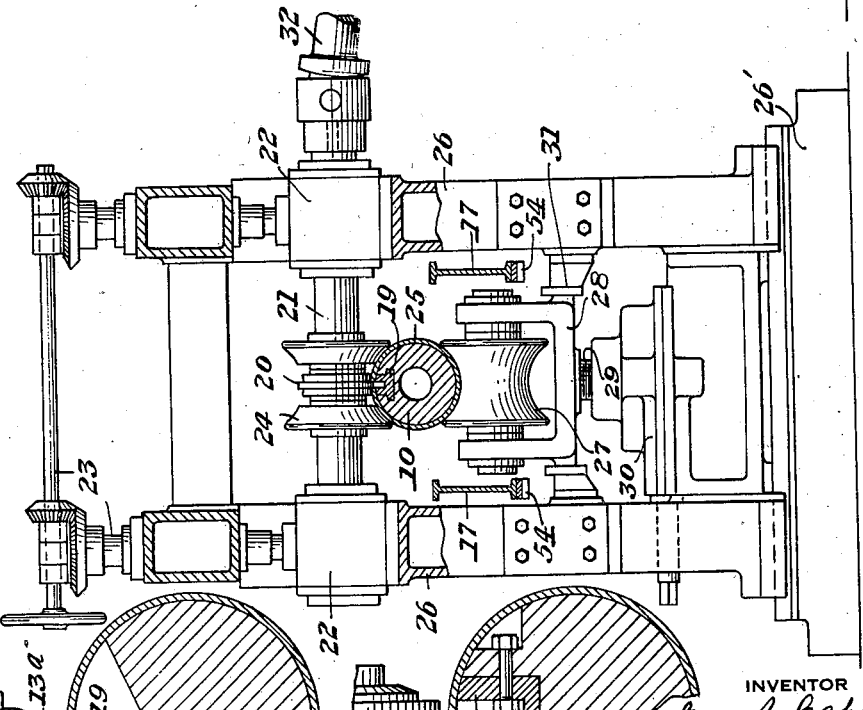
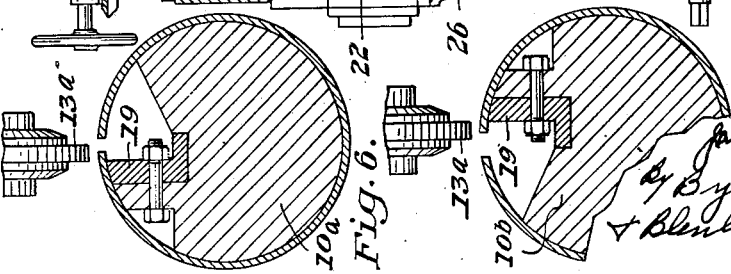

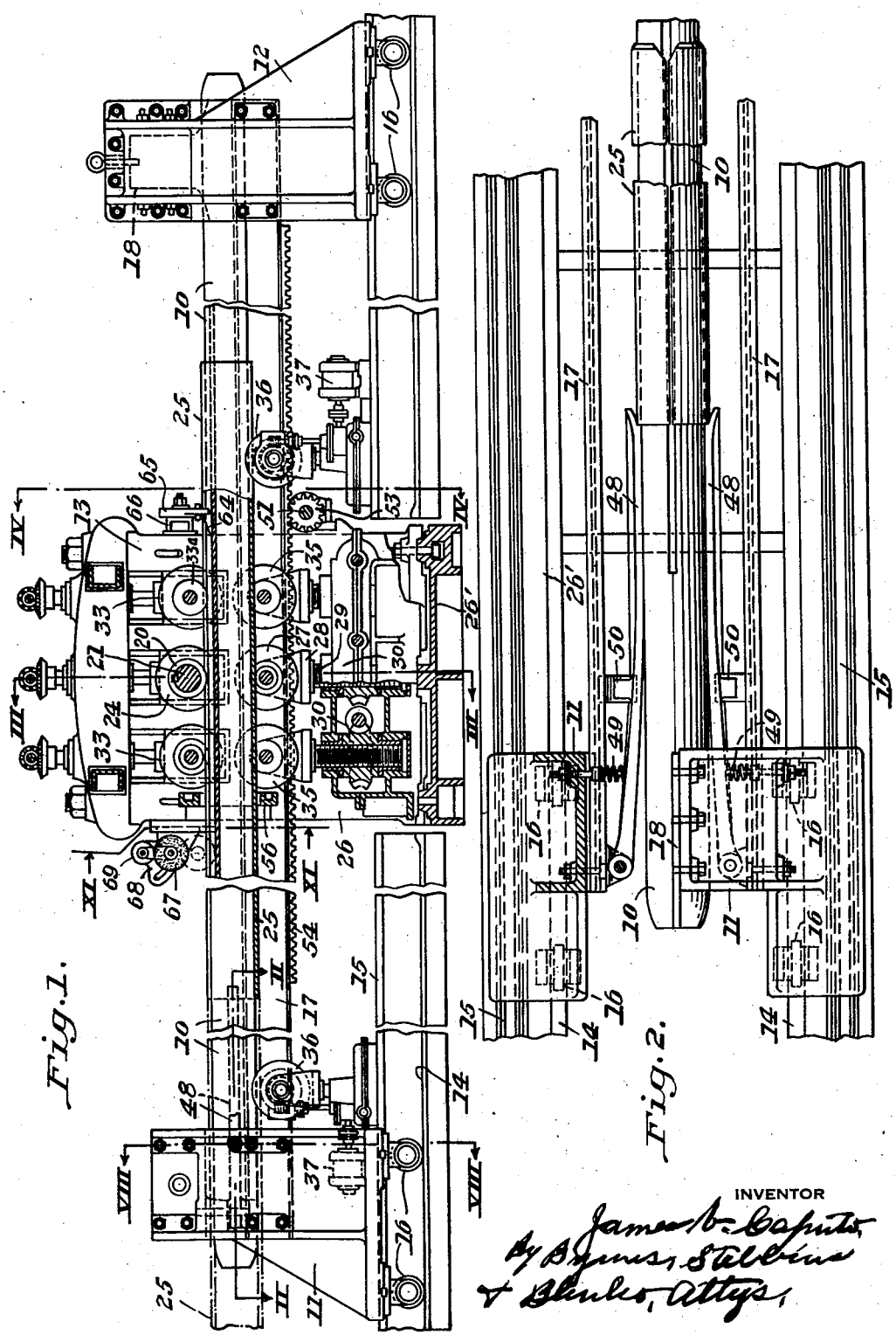

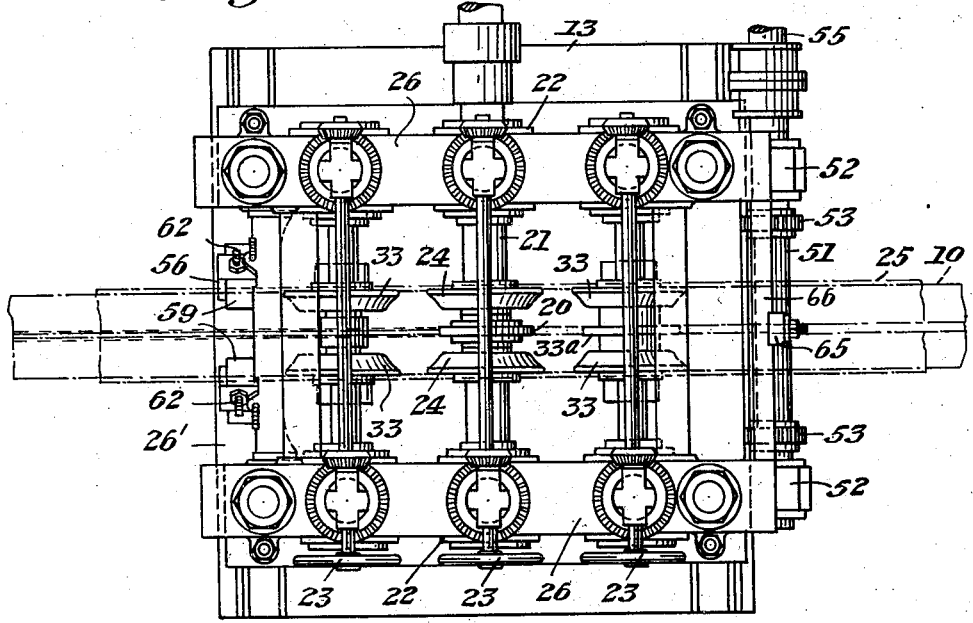
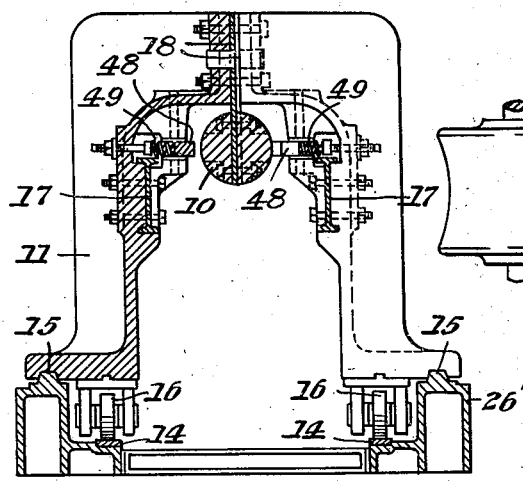
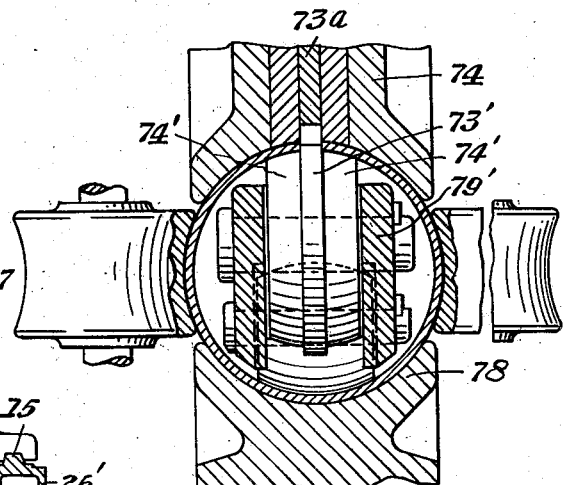
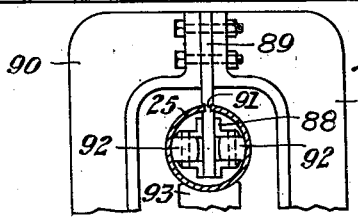

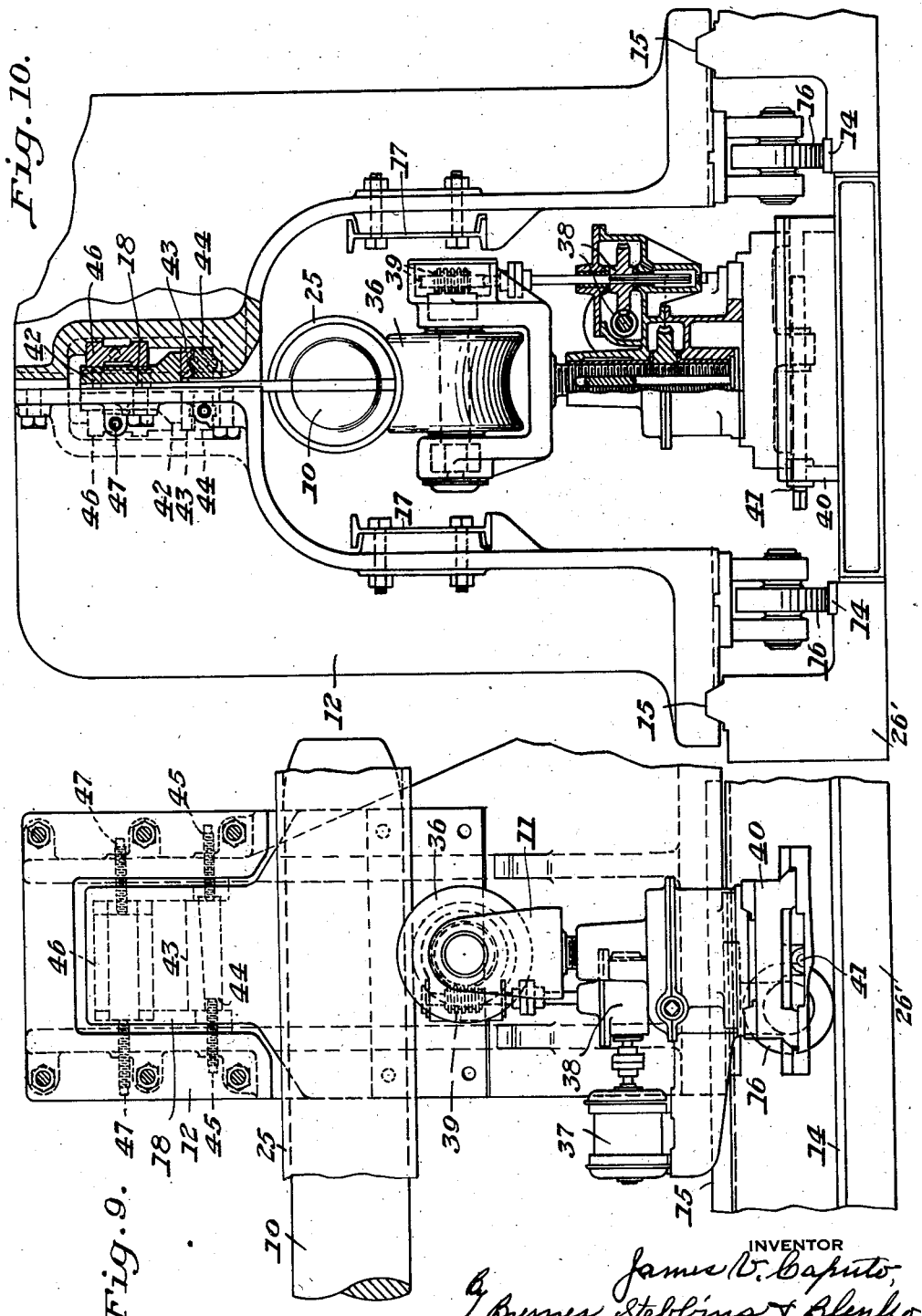

Nov. 30, 1937.    J. V. CAPUTO    2,100,503
MANUFACTURE OF PIPE BLANKS
Original Filed Feb. 11, 1935    14 Sheets-Sheet 5

INVENTOR
James V. Caputo.
By Byrnes, Stebbins & Blenko,
Attys.

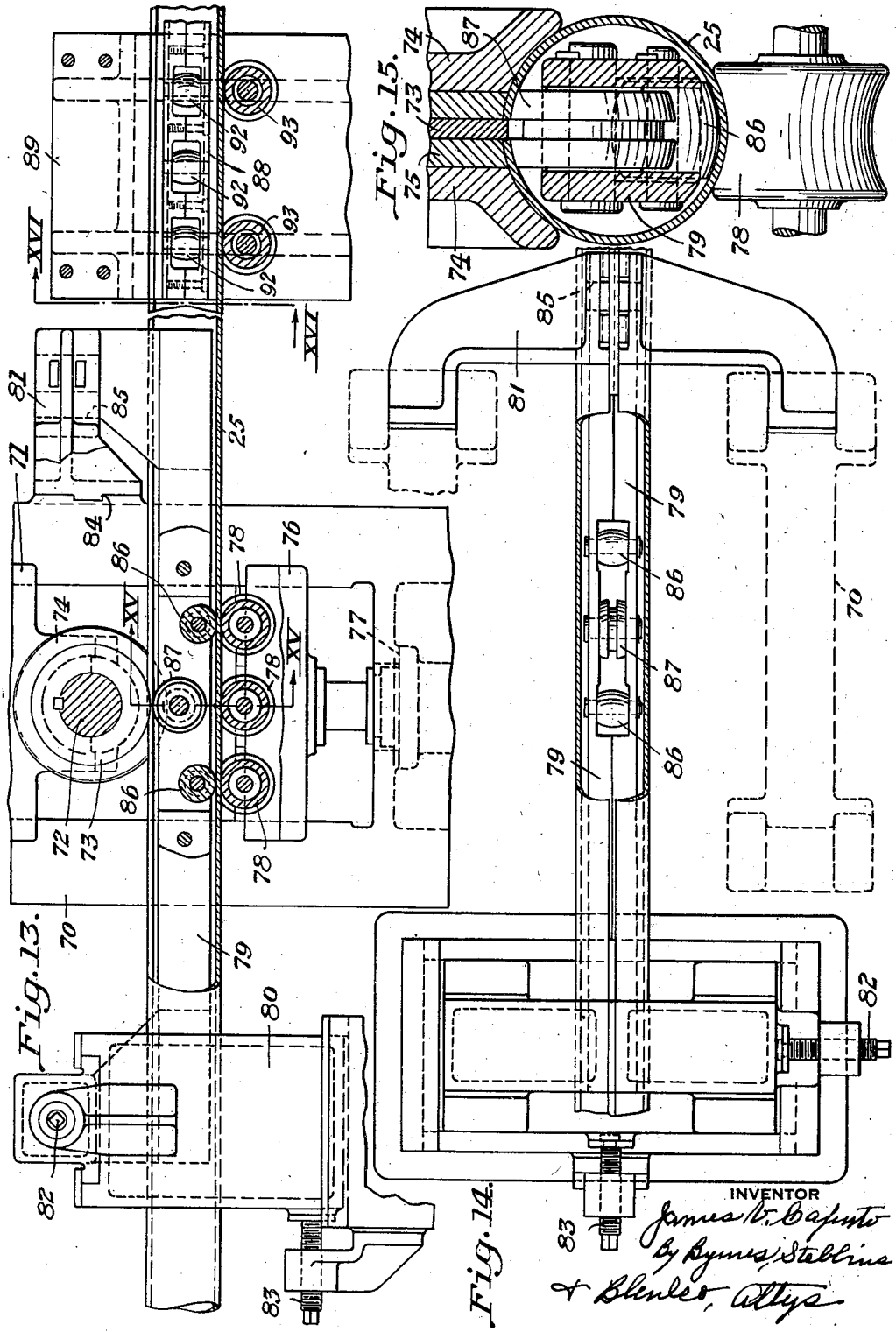

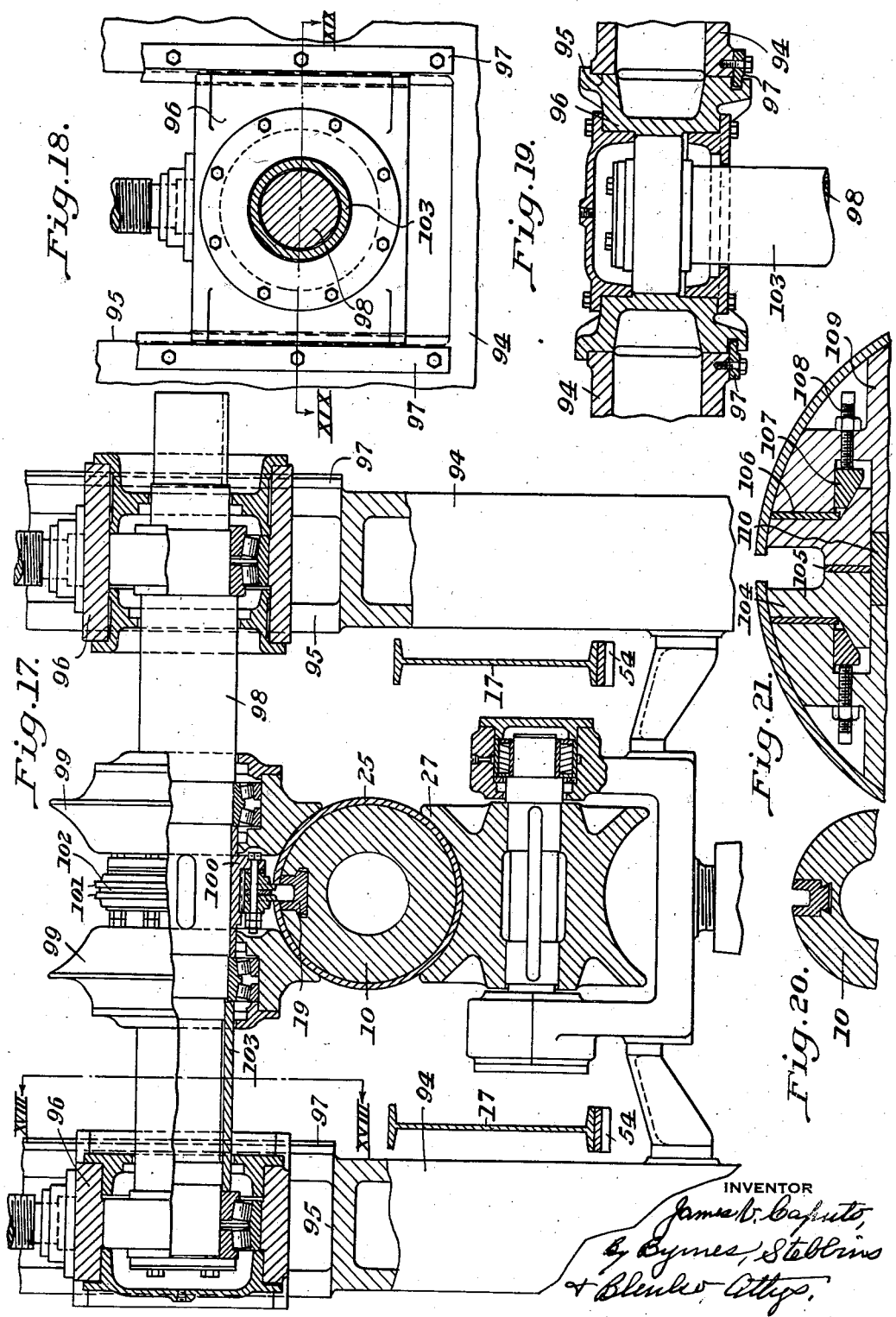

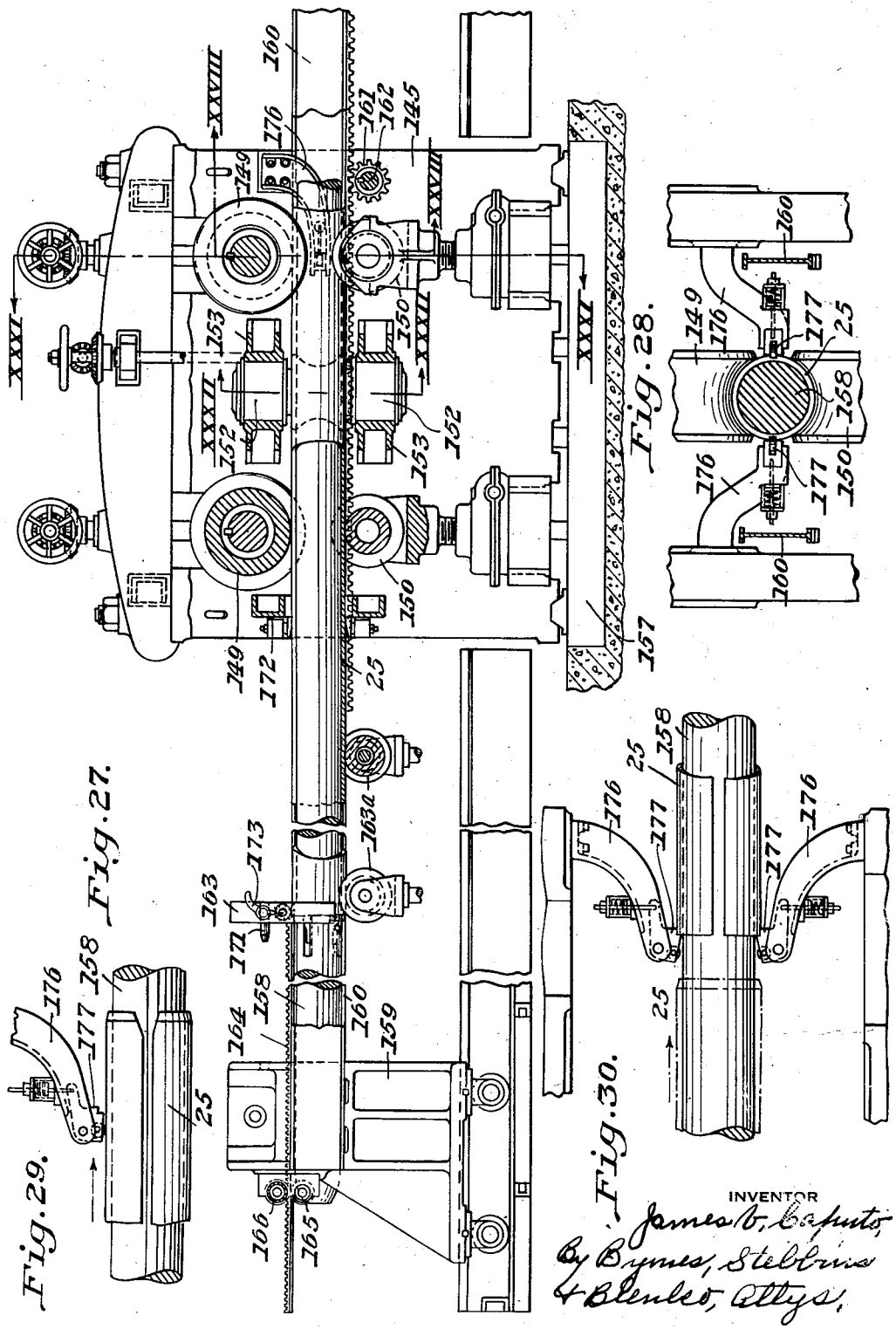

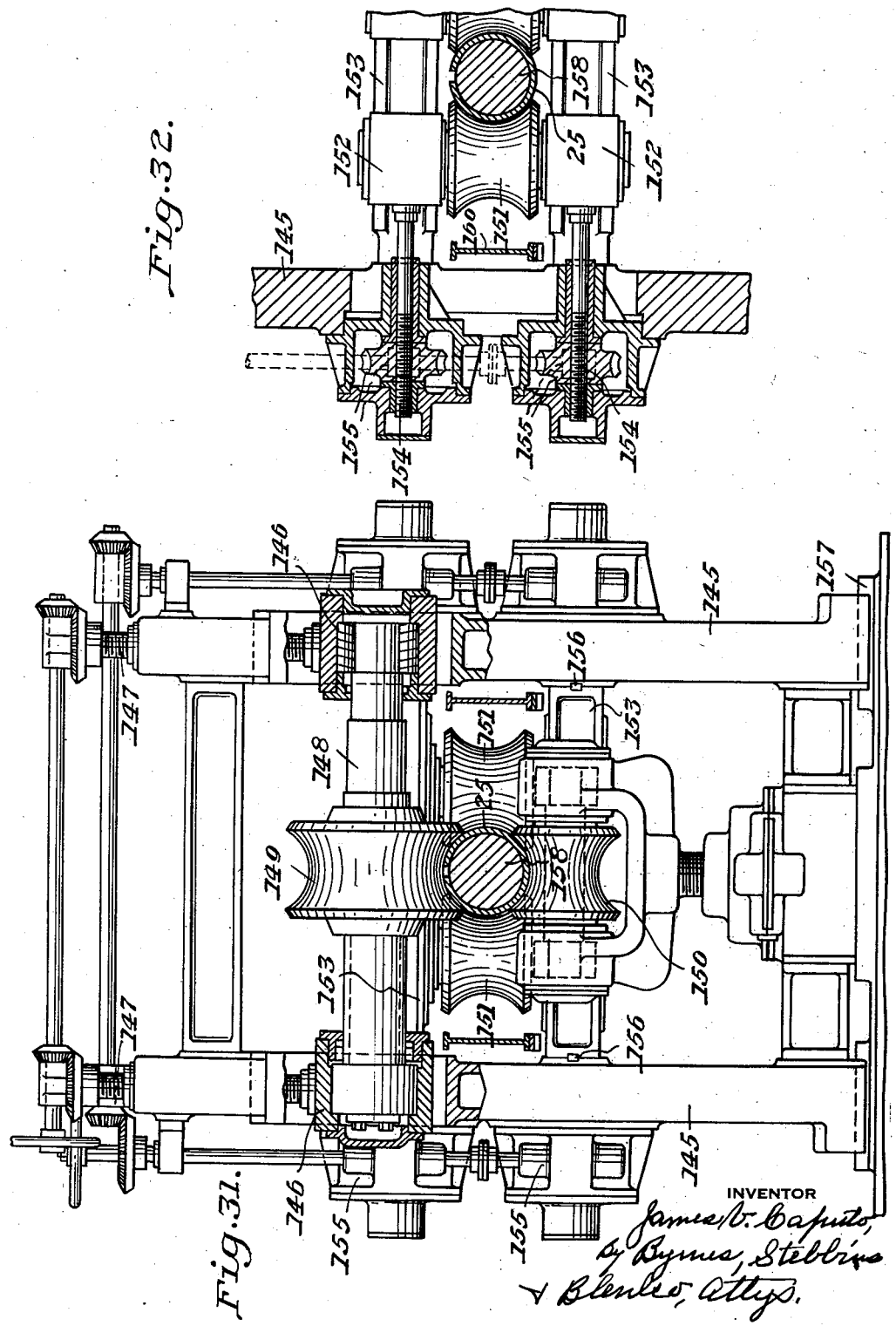

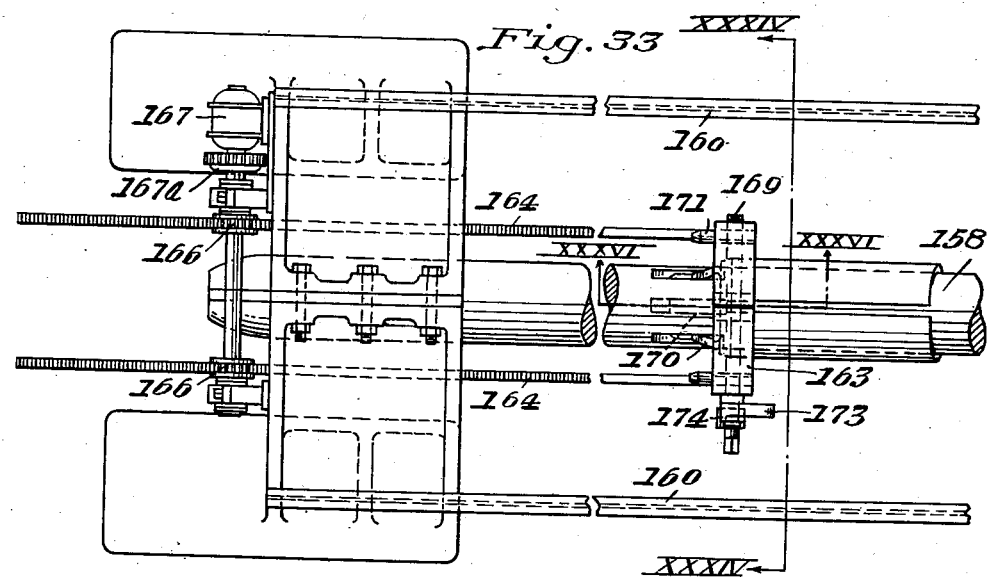
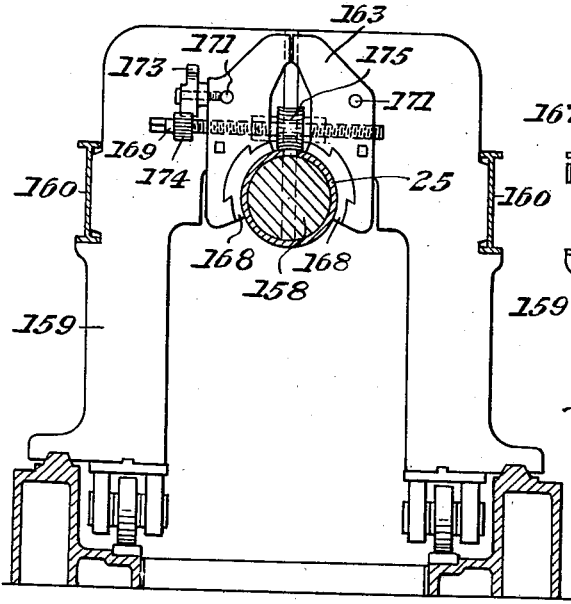
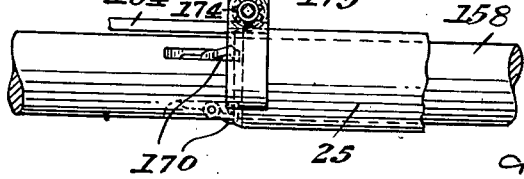

Nov. 30, 1937.   J. V. CAPUTO   2,100,503
MANUFACTURE OF PIPE BLANKS
Original Filed Feb. 11, 1935   14 Sheets-Sheet 13
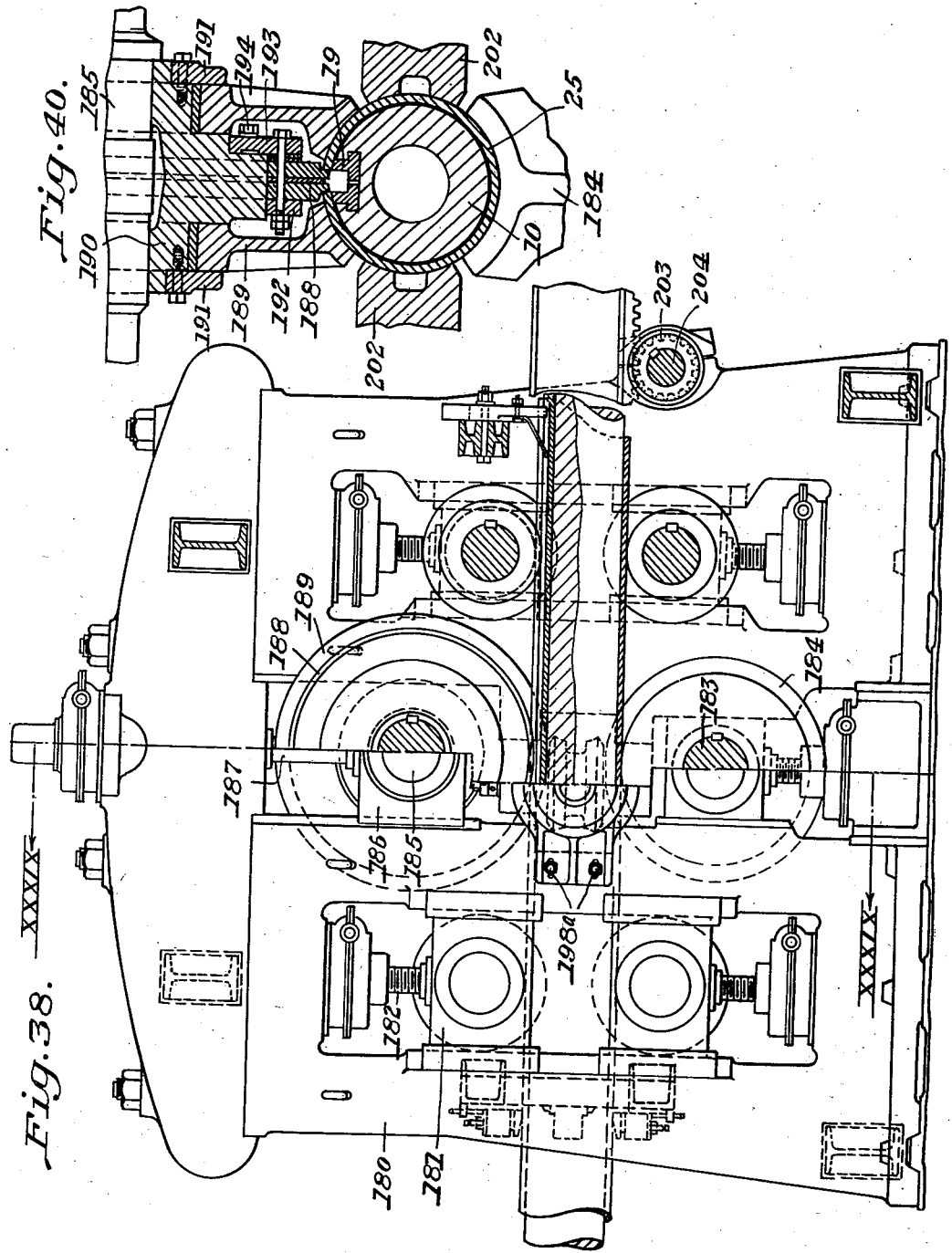

Nov. 30, 1937.  J. V. CAPUTO  2,100,503
MANUFACTURE OF PIPE BLANKS
Original Filed Feb. 11, 1935  14 Sheets-Sheet 14
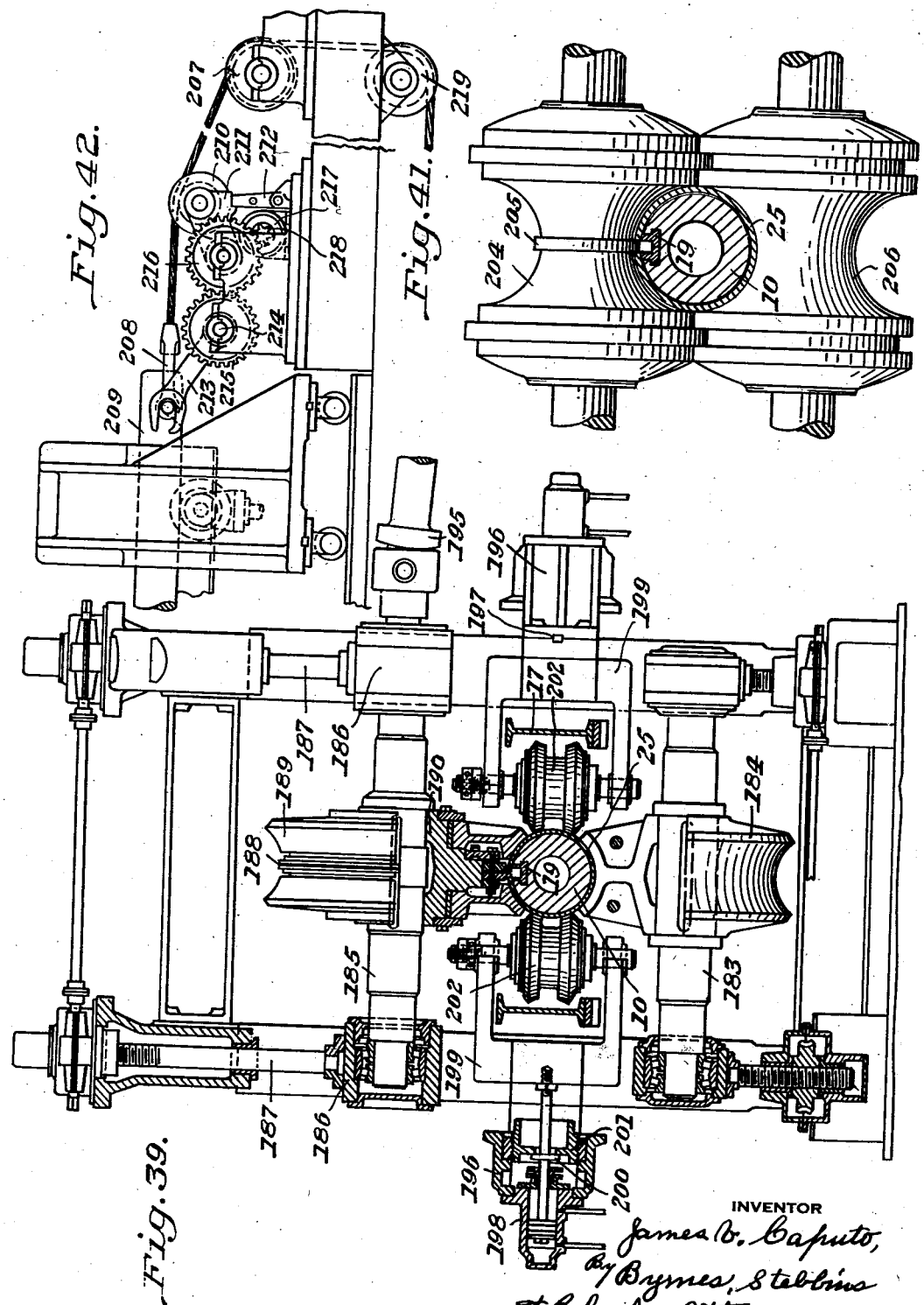

Patented Nov. 30, 1937

2,100,503

UNITED STATES PATENT OFFICE 2,100,503

MANUFACTURE OF PIPE BLANKS

James V. Caputo, Crafton, Pa.

Application February 11, 1935, Serial No. 6,034
Renewed April 13, 1937

53 Claims. (Cl. 29—33)

My invention relates to the manufacture of tubular blanks adapted to be welded to form pipe and, specifically, to the manufacture of pipe blanks having open, longitudinal seam clefts.

Considerable work has been done in the past few years toward improving methods and apparatus for manufacturing pipe by welding tubular blanks but little effort has been expended, so far as I am aware, on the manner of forming the blanks initially, although blanks as made at present are characterized by numerous objectionable features. Among these, the principal one is that the edges of the blank which define the seam cleft are uneven and wavy so that it is difficult to obtain the proper electrical contact therebetween for welding by either the resistance or induction method. This non-linear condition of the edges is most pronounced when the blanks are formed continuously because of the fact that this mode of forming stretches the edges of the blank more than the middle portion thereof as the edges are progressively bent up into tubular form. The same trouble, however, is experienced even with blanks that are formed by presses or dies, or bent edgewise around a rotating mandrel.

In my copending application Serial No. 759,809, filed December 31, 1934, for Pipe welding, I have described and claimed a method of making blanks including the steps of forming flat skelp into tubular shape by any convenient method or apparatus, and disposing the blank so formed on a mandrel for finishing operations such as final forming or shaping and slitting or shearing the edges. The present invention is concerned particularly with improved apparatus for carrying out such method. According to this invention, I provide apparatus for effecting the desired finishing operations on a preliminarily formed tubular blank, including a mandrel adapted to move therethrough on traveling supports. I provide means for manipulating the blank onto the mandrel and for removing it therefrom, and also power means for actuating the mandrel itself. The apparatus for effecting the finishing operation may have any one of a number of different forms, of which several will be considered in detail herein.

For effecting a final shaping of the blank before shearing, I place the blank on the mandrel and pass it through a shaping roll stand wherein the edges and other parts of the blank are subjected to shaping pressure. For the purpose of providing the blank with straight edges, I subject them, preferably after final shaping, to a shearing or trimming operation while on another mandrel. This mandrel has cutting edges extending longitudinally thereof adapted to cooperate with a rotary cutter having a relatively fixed mounting. After shearing, the blanks are ready for welding and finishing.

For a complete understanding of the invention, reference is made to the accompanying drawings illustrating a preferred embodiment of the invention and certain modifications thereof. It is to be understood, however, that the specific details of the apparatus may be varied within the scope of my broader claims without sacrificing the advantages thereof.

In the drawings:

Figure 1 is a longitudinal sectional view through a shearing apparatus, parts being shown in side elevation;

Figure 2 is a sectional view along the line II—II of Figure 1 with parts in plan;

Figure 3 is a sectional view along the line III—III of Figure 1;

Figure 4 is an end elevation with parts in section along the line IV—IV of Figure 1;

Figure 5 is an enlarged section showing a modified form of the mandrel;

Figure 6 is a similar view showing a further modified form;

Figure 7 is a plan view of the shear of Figure 1;

Figure 8 is a sectional view along the line VIII—VIII of Figure 1 with parts shown in elevation;

Figure 9 is a central vertical sectional view through one of the traveling yokes adapted to support the mandrel;

Figure 10 is a transverse sectional view taken substantially centrally of Figure 9, with parts in elevation;

Figure 13 is a view similar to Figure 1 showing a modified form of construction;

Figure 14 is a plan view with parts in section and other parts being shown in outline only;

Figure 15 is a partial sectional view along the line XV—XV of Figure 13 to enlarged scale; certain parts being omitted;

Figure 15a (Sheet 3) is a view similar to Figure 15 showing a modified construction;

Figure 16 is a sectional view along the line XVI—XVI of Figure 13;

Figure 17 (sheet 7) is a view similar to Figure 3 showing a modified construction;

Figure 18 is a sectional view along the line XVIII—XVIII of Figure 17;

Figure 19 is a sectional view along the line XIX—XIX of Figure 18;

Figure 20 is a sectional view of the mandrel showing a modified form;

Figure 21 is a similar view showing a further form;

Figure 27 is a central longitudinal sectional view with parts in elevation, of a final forming apparatus;

Figure 28 is a sectional view along the line XXVIII—XXVIII of Figure 27;

Figure 29 is a partial plan view of a detail;

Figure 30 is a similar view showing the apparatus of Figure 29 in alternative position;

Figure 31 is a sectional view along the line XXXI—XXXI of Figure 27;

Figure 32 is a sectional view along the line XXXII—XXXII of Figure 27;

Figure 33 is a plan view of the traveling yoke shown toward the left of Figure 27;

Figure 34 is a sectional view along the line XXXIV—XXXIV of Figure 33;

Figure 35 is an end elevation of the yoke shown in Figures 27 and 33 looking from the left;

Figure 36 is a partial section along the line XXXVI—XXXVI of Figure 33 with parts broken away;

Figure 37 is a side elevation, to enlarged scale, of a detail shown in Figure 27;

Figure 38 is a side elevation with parts in section showing the preferred form of shearing machine;

Figure 39 is a sectional view along the line XXXIX—XXXIX of Figure 38;

Figure 40 is a sectional view showing a portion of the apparatus shown in Figure 39 to enlarged scale;

Figure 41 shows a modified form of the apparatus of Figure 40; and

Figure 42 is a partial side elevation showing a modified form of mandrel-actuating mechanism.

Figure 11:
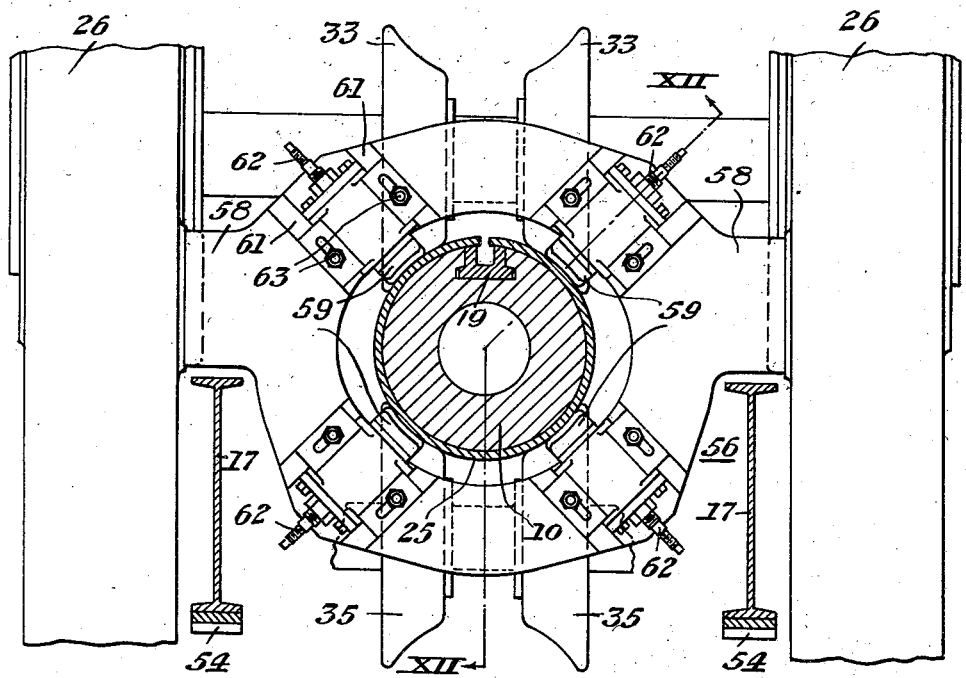
Figure 11 is a partial end view of the shearing mechanism to enlarged scale with parts in section.
Figure 12:
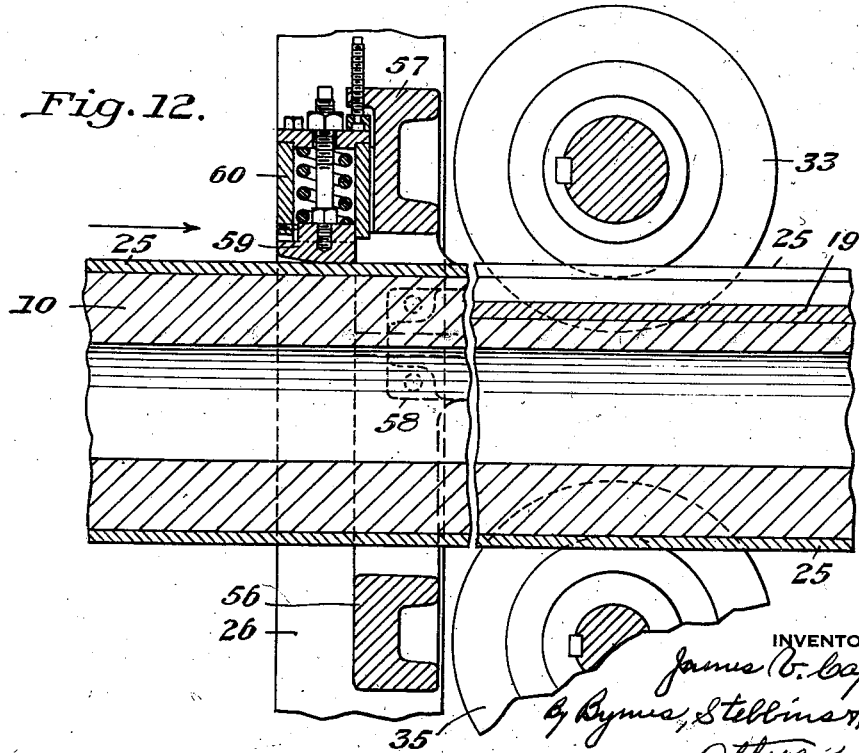
Figure 12 is a section along the line XII—XII of Figure 11.

While I shall describe the shearing machine and some of its modifications first, it will be understood that the blanks are passed therethrough only after emerging from the final forming machine, which will be described later.

Referring now in detail to Figures 1 through 12, a mandrel 10 is supported adjacent its ends on traveling yokes 11 and 12 for movement to and fro through the pass or throat of a shearing machine 13. The yokes have wheels 16 running on rails 14. Guides 15 maintain the yokes in proper alignment. The wheels 16 are journaled in anti-friction bearings arranged for longitudinal transverse movement relative to the yokes. The yokes are connected by spaced parallel thrust members 17 here shown in the form of I-beams.

The mandrel 10 is supported from the yokes 11 and 12 on plates 18. The mandrel has a longitudinal groove adapted to receive an insert 19 having spaced parallel cutting edges thereon. These edges cooperate with a cutter 20 of the shearing machine 13. The cutter 20 is keyed to a shaft 21 journaled in bearings 22. The bearings are adjustable vertically in supporting housings by a screw mechanism 23. The shaft 21 also carries roll sections 24 for gripping a blank, shown at 25, when disposed on the mandrel 10. The bearings 22 and screw mechanism 23 are carried in housings 26 which are adjustable laterally on a base 26'.

A bottom support roll 27 cooperates with the roll sections 24 in holding the blank on the mandrel for shearing. The roll 27 is journaled in a yoke 28 carried on an adjusting screw 29. A worm and worm wheel adjustment 30 is provided for the screw 29. Guides 31 projecting inwardly of the housings 26 hold the yoke 28 in proper position.

A driving connection for the shaft 21 is indicated at 32. Any convenient source of power (not shown) may be employed.

Guide rolls 33 are journaled in the housings 26 on opposite sides of the cutter 20 in about the same manner as the latter. The roll 33 on the exit side of the shearing mechanism has a fin 33a adapted to enter the seam cleft and depress the edges trimmed therefrom into the groove in the insert 19. The fin 33a also aids in guiding the mandrel by engaging the insert. Bottom support rolls 35 cooperate with the rolls 33. The rolls 35 are mounted in the same manner as the roll 27. The rolls 33 and 35 on the exit side of the shear may be adjusted to cold work the edges of the blank if desired, to condition them for welding.

Auxiliary supporting rolls 36 cooperate with the rolls 33 and 35 to support the blank and mandrel as they progress through the shear. The rolls 36 are journaled in screw-mounted yokes, similar to those which carry the rolls 35. A driving motor 37 is provided for each of the rolls 36 and the drive includes two worm reduction gears 38 and 39, and a vertical shaft splined to the former. The rolls 36 with their driving motors are carried on bases 40 and are adjustable transversely thereof by screw shafts 41. As shown in Figure 10, the rolls 36 and their mountings are arranged to permit the yokes 11 and 12 to pass thereover without interference.

The plate 18 is adjustably supported in the yoke 12. Side bars 42 are secured to the upper end of the plate 18 and rest on wedge blocks 43. Wedges 44 adjustable axially of the yokes by means of screws 45 permit the plate 18 to be raised or lowered. Wedges 46 similarly cooperate with the side bars 42 to shift the plate 18 laterally. Adjusting screws 47 are provided to actuate the wedges 46.

The yoke 11 is provided with pusher arms 48 to prevent backward slippage of the blank on the mandrel as the latter is moved toward the shear. The arms 48 are pivoted to the members 17 adjacent their ends and are urged inwardly by springs 49. Bearings 50 are provided to give support to the arms which are slidable thereon.

The drive for the mandrel includes a shaft 51 journaled in bearings 52 carried by the housings 26. Pinions 53 on the shaft 51 mesh with rack teeth 54 on the lower edges of the members 17. A drive shaft 55 connected to any source of power serves to rotate the shaft 51 and reciprocate the mandrel 17 and, with them, the mandrel 10 and yokes 11 and 12.

An entering guide 56 is disposed at the left end of the shearing machine 13, as viewed in Figure 1. This guide is illustrated in detail in Figure 11 and comprises a ring or yoke 57 having ears 58 by which it is secured to the housings 26. Spring-urged presser feet 59 are carried in housings 60 slidable along guides 61 formed on the ring 57. Adjusting screws 62 and clamping bolts 63 permit the spring housing 60 to be adjusted to and locked in the desired position.

In the operation of the apparatus described so far, the mandrel 10 is first moved to the left, as viewed in Figure 1, sufficiently to permit the introduction onto the mandrel of a blank between the yoke 11 and the shearing machine 13. The blank will have been finally formed by apparatus to be described later, and may be advanced onto the mandrel 10 by a roll table or other conveyor. The supporting plate 18 of the yoke, of course, is passed between the edges of the seam cleft of the blank. The pusher arms 48 are displaced as the blank advances onto the mandrel and spring in behind it as the trailing end passes therebeyond. With the rolls 27, 33 and 35 properly set, and the cutter 20 adjusted to cooperate with the edges of the insert 19, the rigid structure constituted by the yoke and the thrust member 17 is then advanced by driving the shaft 51, to carry the blank through the shear. As before stated, the rolls 33 and 35 press the blank tightly onto the mandrel and the cutter 20 and insert 19 effect a clean shearing of both edges of the blank. A spring finger 64 is carried on a block 65 adjustably secured to a cross arm 66 at the exit side of the shear for removing the trimmed edge of the skelp from the groove in the insert 19. The pusher arms 48 pass between the rolls 33 and 35 as the trailing end of the blank approaches them and thus are effective to push the blank entirely through the shear. When the blank emerges from the shear, it opens up sufficiently by its natural resilience to permit its being slid through the yoke 12 and off the end of the mandrel 10 for delivery to any convenient type of welding machine.

For the purpose of dressing the cutting edges of the insert after they have worn, I mount a dressing tool 67 on a bracket 68 carrying a motor 69 for driving the tool. The bracket 68 is carried on the housing 26 for vertical movement whereby the tool 67 may be lowered to the dotted line position. Movement of the mandrel back and forth while the tool is lowered, restores the cutting edges of the insert to the proper condition of sharpness. The mandrel 10 may be solid or hollow, the principal requirements being that it be sufficiently straight and rigid. The auxiliary rolls 36 operate to move the blank onto and off of the mandrel, as well as to support the mandrel while the blank is passing through the shear.

The leading end of the blank is notched adjacent the seam cleft, as shown in Figure 2. While the ends of the blank are also beveled circumferentially, the cutter 20 and the edges of the insert 19 are effective immediately to sever the blank edges, because they engage the blanks inwardly of the beveled end by reason of the notch referred to. A ragged beginning of the cut which might result if the cutting edges engaged the beveled end of the pipe first, is thus avoided.

If desired, for any reason, I may shear the two edges of the seam cleft successively instead of simultaneously. For this purpose, mandrels 10a and 10b, shown in Figures 5 and 6, are employed. Two shears like that shown at 13 are employed in tandem, one being effective to remove one edge and the other, the other edge. It is possible, furthermore, to mount two single edge cutters in the shear 13, instead of the double edge cutter 20, for cooperation with the respective edges of the insert 19. With such machine, the two edges could be sheared simultaneously or successively on forward and reverse strokes of the mandrel, one cutter being raised while the other is cutting. The double cutter 20, furthermore, may be employed to shear one edge at a time on successive passages of the blank, if desired.

A slightly different form of shear is shown in Figures 13 through 16. This construction includes housings 70, having bearings 71 slidable thereon in which a shaft 72 is journaled. The shaft 72 carries a cutter 73 and roll sections 74 separated by spacers 75. A bearing block 76 also slidable in the housings 70 is supported by a hydraulic cylinder 77 and is provided with rolls 78 for supporting a blank while being sheared. A mandrel 79 is supported from a relatively fixed yoke 80 at one end, and at the other from a bracket 81 carried by the housings. The yoke 80 and the bracket 81 are adjustable longitudinally and transversely, the former having adjusting screws 82 and 83 and the latter having guides 84 and 85. The mandrel 79 has internal rolls 86, cooperating with the supporting roll 78, and a grooved roll 87 cooperating with the cutter 73.

A mandrel 88 is adapted to receive the blanks after they have passed through the shear. The mandrel 88 is supported by plates 89 from yokes 90 (see Figure 16, Sheet 3). The plates 89 are grooved at 91 to receive the edges of the seam cleft which are spaced by rollers journaled on the mandrel, whereby the blank passes freely over the latter. Supporting and driving rolls 93, journaled on the yokes 90, advance the blank over the mandrel 88 and to the welding machine (not shown).

A modified form of cutter for the shear of Figure 13 is shown in Figure 15a. In the latter, a cutter 73' is incorporated between roll portions 74' forming an internal roll carried by a mandrel 79'. The cooperating roll 74 has a spacer 73a instead of the cutter 73 shown in Figure 15. It will thus be apparent that the machine of Figure 13 is adapted for internal as well as external cutters, whichever may prove more feasible. As indicated in Figure 15a, the apparatus of Figure 13 may be provided with vertical side rolls for gripping the blanks.

A further form of shearing mechanism is shown in Figures 17 through 19. Housings 94 have windows 95 which slidably receive bearing boxes 96. The boxes are maintained in position by gibs 97. A shaft 98 is journaled in roll bearings in the boxes and roll portions 99 are journaled on the shaft for rotation relative thereto. An extension at one end of the shaft enables it to be driven by any convenient means.

A sleeve 100 is keyed to the shaft and carries rotary cutters 101 between which a spacer 102 is disposed. The cutters 101 cooperate with the edges of the insert 19 in the mandrel 10 for trimming the edges of the blank 25.

When the gibs 97 are removed, the bearing boxes may be withdrawn to the left, as shown in Figure 17, and also the shaft 98. In this way, the roll portions and cutters 99 and 101 can be changed without removing the head casting (not shown) which connects the housings. A spacer sleeve 103 on the left-hand of the shaft 98 holds the roll portions 99 together.

Figure 20 shows a slightly modified form of insert for the mandrel 10. A further form is shown in Figure 21. In this form, the cutting edges are formed on separate members 104 separated by a spacer 105 and backed by shims 106. Wedges 107 operated by screws 108 cooperate with shoulders on the members 104. The screws 108 are carried by separate mandrel sections 109 separated by a spacer 110. This built-up mandrel structure has the advantage that it provides a wide range of dimensions with a minimum of mandrel parts. Instead of being solid, the mandrel may be hollow with sufficient reinforcing ribs to give the necessary rigidity.

The spacer 110 makes it possible to adjust the mandrel to a true circular section so as to hold the blank edges in such position during shearing that they will engage throughout their surface when abutted. It also makes possible the holding of the blank edges during shearing in such position (by temporarily deforming the blank to an oval section) that when the edges are brought together for welding, they will form a dihedral angle and have substantially line contact only. While either of these procedures may be preferred under different circumstances, the structure is such as to accommodate both.

The mandrel is also preferably formed sectionally longitudinally thereof. The sections may be secured together in any convenient manner, each section being provided with its own length of insert with the cutting edges formed thereon.

A slightly different form of shear is illustrated in Figures 22 through 26. In this form, a base 110 carries columns 111 connected by a head casting 112. An upper carriage 113 is slidable on the columns, 111 being resiliently suspended by spring-supported hangers 114 and adapted to be adjusted downwardly by screws 115, the screws being driven by a motor 116 through suitable spur and worm gear reducers 117.

Bearings 118 on the carriage 113 support a large-diameter, built-up cutter 119 mounted on a shaft 120 for which a driving connection 121 is provided.

A support roll 122 similar to the roll 27 of Figure 3 is mounted below the cutter 119. The roll is carried by roller bearings on a shaft 123, one end of which is threaded through a nut 124 whereby the shaft 123 may be moved axially to adjust the roll. A lock nut 125 holds the shaft in adjusted position.

The drive for the thrust member 17 is similar to that shown in Figure 1 except that the shaft 51 has rolls 126 engaging flanges 127 on the racks carried thereby. These rolls support the thrust members against excessive deflection.

Figure 23:
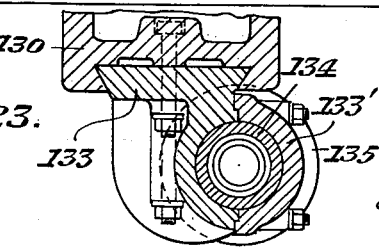
Figure 23 is a sectional view along the line XXIII—XXIII of Figure 22.
Figures 25, 26:
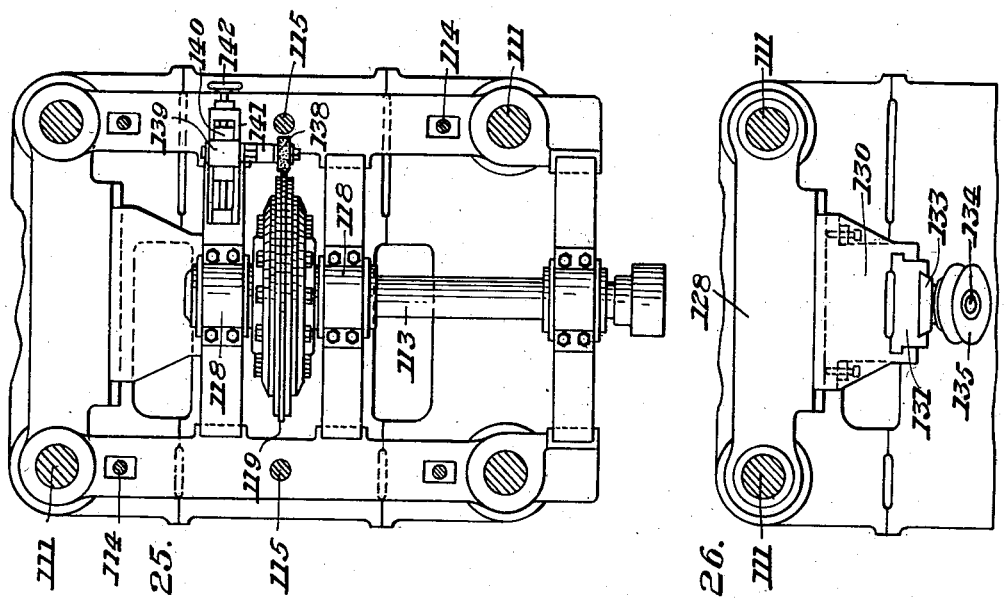
Figure 25 is a sectional view along the line XXV—XXV of Figure 24.
Figure 26 is a sectional view along the line XXVI—XXVI of Figure 22.
Figure 24:
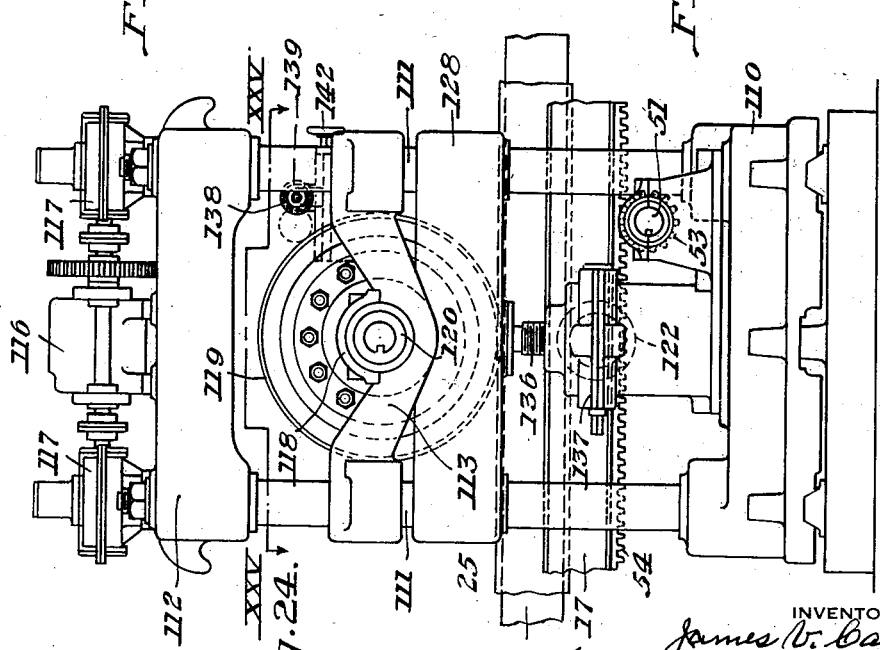
Figure 24 is a side elevation of the apparatus of Figure 22.

Auxiliary carriages 128 are carried on the pairs of columns on opposite sides of the cutter 119. Each carriage has a slide 130 adjustable longitudinally thereof. The slides 130 carry brackets 131 adjustable angularly thereof, each bracket having a slide 133 movable longitudinally thereof with bearings 133' thereon. Shafts 134 journaled in the bearings 133' have gripping rolls 135 thereon cooperating with the mandrel 10. As shown in Figure 23, the shafts 134 with their rolls 135 are removable laterally of the brackets 131.

The carriages 128 are supported on screws 136 having a worm and worm wheel drive 137, similar to the adjustment for the supporting roll 27.

The base 110 is adjustable laterally the same as the base 126'.

A cutter dressing tool 138 with its driving motor 139 is carried on a slide 140 movable in guides 141 by a hand wheel and adjusting screw 142. The tool 138 may thus be advanced into engagement with the cutter 119 when it is desired to renew the edges of the latter.

Figures 27 through 37 illustrate one form of final shaping machine and the details thereof. This machine comprises housings 145 having windows in which bearings 146 are adjustable by screw mechanisms 147. Shafts 148 are journaled in the bearings and carry shaping or forming rolls 149. Bottom rolls 150 similar to those shown at 27 in Figure 1 cooperate with the rolls 149. Vertical rolls 151 are journaled in bearings 152 slidable on transoms 153 extending between the housings. Adjusting screws 154 operated by worm and worm wheel mechanisms 155 permit lateral adjustment of the bearings 152. The transoms 153, furthermore, are mounted between the housings for movement longitudinally thereof on keys 156. The housings 145 are also mounted for lateral adjustment on a base 157.

A mandrel 158 is suspended from yokes 159, as in the case of the shearing machine of Figure 1. The mandrel, of course, is adapted to receive a blank after preliminary forming and pass it through the shaping machine for final forming. Thrust members 160 connect the yokes and have rack teeth thereon for engagement by a pinion 161 keyed to a driving shaft 162. Auxiliary support rolls 163a similar to those shown at 36 in Figure 1, assist in moving the blank onto the mandrel.

The yoke 159 has a movable head 163 carried on rack bars 164 slidably mounted in the yoke. The bars are carried on grooved supporting rolls 165 and are actuated by pinions 166 driven by a motor 167 mounted on the yoke. The head 163 has jaws 168 adapted to be contracted about the mandrel 158 by a screw shaft 169.

The mandrel 158 is provided with yielding supports 170 to reduce the friction between the tubular blanks and the mandrel when they are slid thereon and to minimize wear on the mandrel. These supports may be disposed at intervals along the mandrel and spaced circumferentially thereof, although I have illustrated but one set; and may be provided with rollers adjacent their outer ends.

In operating the final shaping machine, the yokes 159 are moved to their extreme left-hand position, as viewed in Figure 27, and a blank is then advanced on to the mandrel from any suitable support, such as a roll table or other conveyor, by any convenient means, either the motors driving the roll table or a separate pusher. As the blank slides on to the mandrel, it displaces the supports 170 to some extent, but the latter tend generally to hold the blank temporarily free of contact with the mandrel over an extended area to avoid binding. Similar bearings may also be disposed in the mandrels of the shearing machines already described. The jaws 168 of the head 163 are retracted when the blank is advanced so that it passes therethrough without interference. The head itself is retracted toward the yoke 159. It is held in this position by a pin 171 on the head which is adapted to enter a hole in the yoke form.

When the blank has passed the head 163, it may then be further advanced by running out the rack bars 164 and the head 163 carried thereby, or the rolls 163a may be relied on for this purpose. The jaws 168 are then contracted by turning the screw shaft 169, to clamp the trailing end of the blank tightly to the mandrels.

The driving shaft 162 is then operated to advance the thrust members 160 and with them the mandrel 158 and the yokes 159. The blank is directed into the first stand of rolls 149 and 150 by an entering guide 172, similar to that which has already been described for the shearing machine. The rolls of the several stands of the shaping machine having been previously set to the desired position, engage the blank and effect a final shaping thereof around the mandrel 158.

I prefer that the shaping rolls of the several stands be turned to slightly differing contours so that the blank will first be pressed against the mandrel at the portion diametrically opposite the seam cleft and that the gripping action will gradually spread up around the blank toward the seam so that the blank will be tightly wrapped around the mandrel without wrinkles or fullness at any point on its circumference. The result can be obtained by turning the bottom roll 150 first engaged by the blank to a contour conforming strictly to that of the mandrel, at least in the central portion of the roll groove, and by having the contour of the cooperating top roll 149 turned so as to allow any fullness in the blank to work up around the mandrel and smooth out at the seam cleft. Successive stands of rolls should have their contours conform to that of the mandrel for an increasingly large proportion of the entire mandrel periphery whereby the described result, namely, the gradual working of any fullness out of the edges of the blank, is readily obtained.

When the head 163 has advanced to the entering end of the shaping machine, a dog 173 pivoted on the head engages the housing and is turned on its pivotal mounting. This operates the screw shaft 169 by means of a pinion 174 thereon, to spread the jaws 168. The head 163 can then be retracted. A slip clutch 167a incorporated in the motor drive permits the rack bars 154 to be retracted without driving the motor. When the jaws have been released, a roll 175 journaled in the head supports the latter on the mandrel as it is being retracted.

Bracket arms 176 extend inwardly from the exit end of the shaping machine and have spring-actuated detents 177 pivoted adjacent the ends thereof. As shown in Figure 29, these detents are displaced by the leading end of the blank. When the trailing end has passed, the detents spring inwardly to the position shown in Figure 30 to hold the blank when the mandrel 158 is being retracted at the conclusion of the shaping operation to strip the blank therefrom.

Another form of shearing machine is shown in Figures 38 through 40. In this form of the invention, housings 180 have windows wherein bearing chucks 181 are adjustable by screw mechanisms 182. Shafts 183 journaled in the bearings carry transversely split guiding and supporting rolls 184. A shaft 185 is similarly journaled in bearings 186 carried by adjusting screws 187. Rotary cutters 188 are mounted on the shaft between gripping roll portions 189. The construction and mounting of the cutters 188 are best shown in Figure 40. The gripping roll portions 189 are disposed on an arbor 190 keyed to the shaft 185, but are rotatable relative thereto, being held only by the friction of clamping collars 191. The cutters 188 assembled with a spacing liner therebetween are clamped between rings 192 and 193. The ring 193 is secured to the arbor 190 by screws 194.

A driving connection 195 for the shaft 185 extends outwardly on one side of the machine.

Brackets 196 are secured to the outer sides of the housings 180 and are slidable thereon on keys 197, clamping bolts 198a being provided for holding the brackets in any adjusted position. Hydraulic cylinders 198 are carried in the brackets 196 and are provided with pistons and piston rods connected to yokes 199 slidable laterally of the housings on suitable guideways. Fluid pressure is normally applied through suitable connections to the outer faces of the pistons to force the yokes 199 inwardly. Flanges 200 on the piston rods are adapted to engage annular stops 201 seated in the brackets 196 to limit such inward movement.

Figure 22:
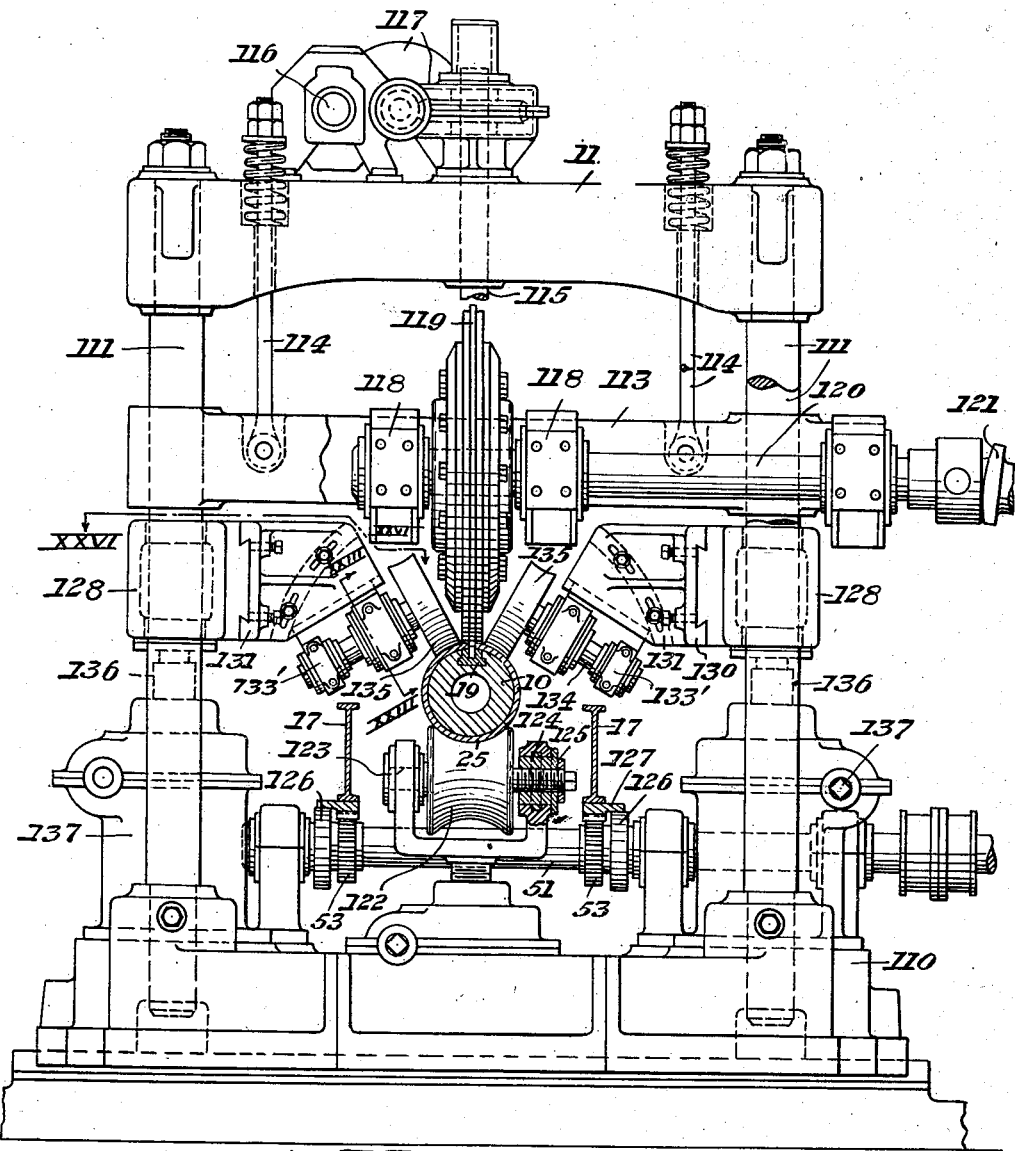
Figure 22 is an end view of a further form of shear, the mandrel and associated parts being shown in section.

Side gripping rolls 202 are journaled in suitable bearings mounted in the yokes 199, these bearings being such as to permit axial adjustment of the rolls 202, in the manner already described for the roll 122 of Figure 22. As shown in Figure 38, the brackets 196 are preferably adjusted so that the center lines of the side rolls 202 lie in a plane displaced toward the entering end of the machine from the vertical plane containing the axis of the shaft 185. The construction of the housings 180 is such that the vertical plane containing the axis of the shaft 183 lies between that containing the axes of the side rolls and that containing the axis of the shaft 185. As the blank enters the machine, therefore, it is first gripped top and bottom by the left-hand stand of rolls as viewed in Figure 38. It is then engaged at the sides by the rolls 202, then by the bottom roll 184, and then by the roll portions 189 and the cutters 188. This insures that the blank is firmly held at all points when the shearing operation commences. The work and the trimmed edges are further guided by the right-hand stand of rolls on the exit end when engaged thereby.

The cutters 188, of course, cooperate with cutting edges formed on an insert mounted in the mandrel, as in the machine of Figure 1, the mandrel being similarly supported on yokes and having thrust members adapted to be actuated by a pinion 203 on a driving shaft 204. Entering guides and cleaning means for the mandrel groove are provided as in Figure 1.

The hydraulic back-up for the side rolls 202 introduces a degree of resilience into the action of the latter to allow for slight discrepancies in the dimensions of the blank which are permitted by usual manufacturing tolerances. A similar resilience for the roll 184, the roll portion 189 and the cutters 188, is provided by the spring of the shafts 183 and 185 under abnormal load.

While I prefer that the gripping rolls 184 and 189 be idlers, because they thus adjust themselves to the proper speed relative to the movement of the blank to reduce any marking of the latter to a minimum, it is possible to advance the work through the machine by driving these rolls, and thus dispense with the rack and pinion drive for the mandrel already described. The two stands of rolls at the entrance and exit ends of the mill could be driven, for example, from a single drive shaft through suitable reducing gear, a gear box including a driving gear for each of the rolls, and a pinion driven from the low speed shaft of the gear reducer and meshing with the driving gears.

Instead of using separate side rolls, as shown in Figure 39, I may employ a single pair of gripping and supporting rolls to embrace substantially the entire periphery of the blank while the shearing is being effected. An arrangement of this sort is shown in Figure 41, wherein the top roll 204 has a cutter 205 incorporated therein and cooperates with a similarly shaped bottom roll 206, the two rolls being grooved to embrace the entire periphery of the blank therebetween. The rolls 204 and 206 have interfitting ribs and grooves to insure their maintenance in proper alignment.

A modified form of means for advancing the mandrels and yokes through the shearing and shaping machines is illustrated in Figure 42. This means includes a winch 207 driven by any convenient source of power and a clevis 208 attached to the winch cable and adapted to engage in a slot in the forward end of the mandrel indicated at 209. A guide pulley 210 is journaled in a pivoted bearing 211 normally supported by a removable strut 212. A fork 213 is adapted to engage the clevis 208 to remove the latter from its slot in the mandrel. The fork 213 is keyed to a shaft 214 on which a gear 215 is also keyed. The movement of the pivoted bearings 211 for the pulley 210 is controlled by a gear 216 keyed to the same shaft. A motor 217 has a pinion 218 meshing with the gear 216 which, in turn, meshes with the gear 215. By means of the motor, the pulley 210 and the fork 213 can be lowered, the strut 212 having been turned out of its normal position. This removes the pulley 210 from the path of the mandrel and unhooks the clevis from the latter. The mandrel is then free to discharge the blank positioned thereon. After the blank has been discharged, the motor 217 is reversed to restore the pulley 210 and the fork 213 and the strut 212 is placed in position to support the pulley. The mandrel and its yokes may be returned to their initial position by a run of cable extending backwardly from the winch to the far yoke around suitable guide pulleys, as indicated at 219.

It will be apparent from the foregoing description that the invention provides highly efficient means for rapidly subjecting preliminarily formed blanks to a final shaping and shearing of the uneven edges thereof preparatory to welding. The advantages of so finally shaping and shearing the blanks before welding will be readily appreciated by those experienced in the latter art. The machines disclosed herein are capable of a wide range of adjustability to handle various sizes of blanks. The mandrels furthermore and the cutting edges thereof may be adjusted to accommodate blanks of different wall thickness designed for the manufacture of tubes of the same internal diameter. The blanks are solidly supported on mandrels during all finishing operations and precise forming and trimming are thus insured. The various machines shown are characterized by great ease of adjustment and a ready accessibility of the various parts for inspection or replacement. The use of my invention makes it unnecessary to cold work the edges of the blank before welding as has been proposed heretofore, to eliminate the irregularities from the edges to be joined. It is possible, however, to use the apparatus illustrated at Figures 15 and 15a for such cold working if a smooth disc is substituted for the rotary cutter.

The housings of the blank working mechanisms are adjustable laterally and the rolls and cutters adjustable vertically. One end of the mandrel is also adjustable in both directions so that proper alignment of the various parts can easily be obtained. The mandrel supporting members 18, furthermore, are resilient to a certain extent permitting movement of the mandrel to accomodate itself to the adjustment of forming and supporting rolls and the guiding means on the forming mill and slitting shear. Since the gripping and shaping rolls are idlers, marking of the skelp is minimized. Yielding supports embedded in the mandrel prevent excessive friction between the mandrel and the blank when the latter is being moved over the former and reduced wear on the mandrel. These supports disappear when working pressures are applied. While shown only on the shaping mandrel, they will also be applied to the shear mandrel.

The blank-gripping and stripping means shown on the final forming machine may also be used on the shearing machines. The gripper head is lowered gently on the mandrel by reason of the taper on its holding pin, and is movably supported thereon by rollers. The various adjustments shown for the several blank-engaging rolls may all be incorporated in any roll, if desired.

Although I have disclosed herein but a few of the possible embodiments and practices contemplated by my invention, it will be understood that many changes therein may be made without departing from the spirit of the invention or the scope of the appended claims.

I claim:

1. Apparatus for preparing tubular blanks for welding comprising a mill for engaging and working on the blank, a mandrel extending through the mill and adapted to be moved back and forth therethrough, and means for supporting said mandrel including a pair of movable yokes, one on each side of the mill, said mandrel-supporting means being adapted to permit a blank having an axial seam cleft to pass onto one end of the mandrel and off the other.

2. Tube blank working apparatus comprising a mill adapted to engage and work upon a tubular pipe blank to prepare it for welding, a mandrel adapted to be moved through said mill with a blank disposed thereon, and means including traveling yokes having plates depending therefrom for movably supporting said mandrel for movement relative to said mill.

3. Apparatus for preparing a tubular pipe blank for welding comprising a mill having a plurality of pairs of shaping rolls disposed therein, a mandrel adapted to pass between said rolls with a blank disposed thereon, movable yokes on opposite sides of the mill and means depending from the yokes for supporting the mandrel for movement therethrough.

4. Apparatus for preparing tubular pipe blanks for welding comprising a mill having shaping rolls journaled therein, a mandrel adapted to pass between said rolls with a blank disposed thereon, traveling yokes movable relative to said mill and means depending from the yokes for supporting said mandrel.

5. Apparatus for preparing tubular blanks for welding comprising a stand of shaping rolls, a mandrel adapted to move therethrough with a blank disposed thereon, movable yokes having plates depending therefrom for supporting the mandrel, and means for driving the mandrel through the mill.

6. Apparatus for preparing tubular blanks for welding comprising a stand of shaping rolls, a mandrel adapted to pass therebetween, traveling yokes having plates depending therefrom for supporting the mandrel, and longitudinal thrust members connecting said yokes.

7. The apparatus defined by claims 6 characterized by driving means for said mandrel cooperating with said thrust members.

8. Apparatus for working tubular blanks comprising a roll pass, a mandrel adapted to pass therethrough with the blank thereon, a traveling yoke supporting one end of said mandrel, and a gripping head extensibly mounted on said yoke for gripping one end of the blank about the mandrel.

9. Apparatus for working tubular blanks comprising a roll stand, a mandrel adapted to pass therethrough with a blank thereon, traveling yokes supporting the mandrel for such movement, and stripper means mounted adjacent said roll stand for holding the blank against return movement on reversal of the mandrel.

10. Apparatus for working tubular blanks comprising a mandrel adapted to receive a blank thereon, and yielding supports carried by the mandrel normally effective to support the blank in spaced relation thereto.

11. Blank-working apparatus comprising a pair of housings, windows in the housings having bearings journaled therein, a shaft journaled in said bearings, a blank-engaging roll on said shaft, a yoke disposed between said housings, a roll journaled therein cooperating with said first-mentioned roll, said yoke being carried on a vertically disposed adjusting screw.

12. Apparatus for working on tubular blanks comprising a guide roll stand and means for directing a blank thereinto including a yoke through which the blank is adapted to pass, and means resiliently mounted on the yoke and providing a tapering throat for receiving the blank and guiding it into said roll stand.

13. Apparatus for preparing tubular blanks for welding comprising a mandrel having cutting edges incorporated therein, a rotary cutter adapted to cooperate with said edge, means for supporting the mandrel for movement relative to said cutter with a blank disposed thereon, and means for rotatably mounting said cutter in a fixed position.

14. Apparatus for preparing tubular blanks for welding comprising a mandrel having a cutting edge extending therealong, means supporting said mandrel for longitudinal movement, a fixed rotary cutter adapted to cooperate with said edge, and means for moving said mandrel with a blank disposed thereon relative to said cutter whereby said edge and cutter cooperate to trim an edge of said blank.

15. Apparatus for preparing tubular blanks for welding comprising a mandrel, means supporting the mandrel for longitudinal movement, said means permitting the movement of a tubular blank having a longitudinal seam cleft onto said mandrel, a cutting edge on said mandrel, a relatively fixed rotary cutter cooperating therewith, and means for moving the mandrel longitudinally relative to said cutter.

16. Apparatus for preparing tubular blanks for welding comprising a shear having opposed guide rolls, a mandrel adapted to move between said rolls with a blank disposed thereon, means movably supporting the mandrel, a cutting edge on the mandrel, and a rotary cutter mounted in the shear for engagement with said edge as said mandrel moves through the shear.

17. Apparatus for preparing tubular blanks for welding comprising a shear having opposed guide rolls journaled therein, a mandrel adapted to move longitudinally between said rolls, a pair of yokes movably supporting said mandrel, a cutting edge extending along said mandrel, a rotary cutter in said shear cooperating therewith, and thrust members connecting said yokes.

18. The apparatus defined by claim 17 characterized by means engaging said thrust members for advancing the mandrel through the shear.

19. Apparatus for preparing tubular blanks for welding comprising a mandrel adapted to receive and support the blank while being worked on, said mandrel having a cutting edge extending therealong, a rotary cutter mounted to cooperate with said edge in shearing said blank, and means for effecting relative movement between the cutter and the mandrel.

20. The apparatus defined by claim 1 characterized by pusher arms on one of said yokes adapted to engage the blank and push it into the mill.

21. A mounting for a supporting roll comprising a yoke in which the roll is adapted to be journaled, a jack screw extending downwardly from the yoke whereby the latter is adjustable vertically, and means for driving said roll comprising a shaft parallel to said jack screw and a driving gear on said shaft having a splined connection therewith.

22. Apparatus for preparing tubular blanks for welding comprising a shear, a mandrel movable longitudinally through said shear and having a cutting edge, said shear having a frame, a rotary cutter journaled therein for cooperation with said edge, and guide rolls journaled in said frame effective to press the blank tightly onto the mandrel as it passes through the shear.

23. The apparatus defined by claim 22 characterized by said cutter being journaled in a carriage adjustable vertically of said frame.

24. The apparatus defined by claim 22 characterized by certain of said guide rolls being mounted for adjustment circumferentially of said mandrel.

25. The apparatus defined by claim 22 characterized by certain of said guide rolls being mounted for independent adjustment vertically of said frame.

26. Apparatus for preparing tubular blanks for welding comprising a housing, a mandrel extending therethrough and fixedly supported relative thereto, guide rolls in said housing and on said mandrel, and a rotary cutter journaled in said housing cooperating with said mandrel to shear an edge of a longitudinal seam cleft in a pipe blank moving over said mandrel.

27. The apparatus defined by claim 26 characterized by a rotary cutter journaled on said mandrel cooperating with the cutter journaled in said housing.

28. The apparatus defined by claim 26 characterized by one end of said mandrel being supported on said housing.

29. Apparatus for working on tubular blanks having longitudinal seam clefts comprising a plurality of rolls for progressively applying pressure to the blank including at least one external and one internal roll bridging the seam cleft, and means carried by one of said rolls projecting into the cleft.

30. A mandrel for supporting tubular blanks having axial seam clefts therein comprising depending members having slots therein adapted to receive the edges of the blank, supporting rolls carried by said members adapted to engage the blank interiorly, and supporting and driving rolls engaging the blank exteriorly.

31. Apparatus for working on tubular blanks comprising a pair of housings, roll means adjustably journaled in said housings for engaging the blank, a yoke mounted between said housings for vertical adjustment, a roll journaled on said yoke cooperating with said roll means, and guides on said housings positioning said yoke.

32. Apparatus for working on tubular blanks comprising a mandrel, a blank working mill through which the mandrel is adapted to pass, and traveling yokes supporting the mandrel adjacent its ends, said mandrel being composed of a plurality of sections assembled together to form a unitary member.

33. Apparatus for working on tubular blanks comprising a plurality of housings, cooperating pairs of rolls journaled in said housings at the entrance and exit ends thereof, bottom and side rolls journaled in said housings between said first-mentioned pairs of rolls, and a rotary shear journaled in said housings substantially in the plane of said bottom and side rolls.

34. Apparatus for working on tubular blanks comprising a plurality of housings, yokes laterally movable in said housings, blank-engaging rolls journaled in said yokes, and yielding back-up means for said yokes.

35. The apparatus defined by claim 2 characterized by means for advancing the mandrel including a flexible tension member and wind-up means therefor.

36. Apparatus for working tube blanks having axial seam clefts therein, comprising a pair of housings, a rotary cutter journaled therein for engaging an edge of the cleft in a blank moving between the housings, a support roll opposite the cutter for holding the blank thereagainst, and pressure rolls between the cutter and support roll so positioned relative to the latter as to define therewith a throat adapted to receive the blank.

37. The apparatus defined by claim 36 characterized by said support roll being offset from the cutter toward the entrance side of the throat.

38. The apparatus defined by claim 36 characterized by said pressure rolls being offset from the cutter toward the entrance side of the throat.

39. Apparatus for preparing tubular blanks for welding comprising a frame, a rotary cutter journaled therein, internal supporting means adapted to be positioned within the blank for cooperating with said cutter, and guide rolls journaled in said frame effective to press the blank tightly onto the blank supporting means.

40. Apparatus for working tubular blanks comprising a mill, blank-working means mounted therein and means for advancing said blanks through said mill including a flexible tension member and wind-up means therefor.

41. Apparatus for working formed blanks with longitudinal seam clefts, said apparatus comprising an internal support for the blanks, means for finally shaping said blanks including rolls cooperating with said internal support and means also cooperating with said support for shearing an edge of the seam cleft.

42. Apparatus for working on a formed blank with a longitudinal seam cleft comprising means for shearing an edge of the seam cleft, and means for advancing said blank past said means, including a flexible tension member and wind-up means therefor.

43. Apparatus for shearing the edges of a seam cleft in a preformed tubular pipe blank comprising a frame, a rotary shear knife journaled horizontally in said frame, and a cutting edge adapted to be disposed within the blank cooperating with said knife.

44. Apparatus for shearing the edges of a seam cleft in a preformed tubular pipe blank comprising a frame, a rotary shear knife journaled horizontally in said frame, a cutting edge adapted to be disposed within the blank cooperating with said knife, and means for moving said blank past said knife.

45. Apparatus for finally shaping a preliminarily formed tubular blank having a longitudinal seam cleft about a mandrel, including means for applying shaping pressure to the blank initially at a point on the periphery thereof substantially diametrically opposite the seam cleft, and means for progressively extending the zone of pressure application toward the seam cleft.

46. Apparatus for shearing the edges of a tubular blank having a longitudinal seam cleft, including means for progressively applying lateral pressure to the blank, and means for shearing the blank edges progressively at a point beyond that at which lateral pressure is applied.

47. Apparatus for shearing the edges of a tubular blank having a longitudinal seam cleft, including means for progressively gripping the tubular blank in advance of the shearing point, means for shearing the edges progressively, means for guiding the tubular blank after shearing and means for guiding the sheared edges of the blank.

48. Apparatus for shearing the edges of a tubular blank having a longitudinal seam cleft, including means for supporting said edges, means for progressively shearing the edges, and means for working the edges after shearing.

49. Apparatus for shearing the edges of a longitudinal seam cleft in a tubular blank, including means supporting said edges at points spaced slightly inwardly thereof, means for applying pressure to the overhanging edges progressively to shear them off, and means for applying pressure to the blank at substantially right angles to the direction of the shearing pressure and in advance of the shearing point.

50. Apparatus for making tubular blanks having a longitudinal seam cleft, the edges of which are adapted to be joined, comprising a plurality of roll stands through which a preliminarily formed blank is adapted to pass successively, a mandrel cooperating with at least one of said stands, and means for advancing a preliminarily formed blank embracing said mandrel through said stands whereby to perform a finishing operation on the blank and prepare it for progressive welding of said edges.

51. Apparatus for making tubular blanks having a longitudinal seam cleft, the edges of which are adapted to be joined, comprising a plurality of roll stands through which a preliminarily formed blank is adapted to pass sucessively, and a mandrel cooperating with at least one of said stands, said mandrel comprising a pair of opposed spaced, substantially semi-cylindrical sections, and a spacer removably disposed therebetween.

52. Apparatus for making tubular blanks having a longitudinal seam cleft, the edges of which are adapted to be joined, comprising a plurality of roll stands through which a preliminarily formed blank is adapted to pass sucessively, and a mandrel cooperating with at least one of said stands, said mandrel comprising a body portion provided with a longitudinal recess, and knife edges removably disposed in said recess in spaced relation and extending longitudinally of the mandrel.

53. Apparatus for preparing tubular blanks for welding comprising a mill for engaging and working on the blank, means extending through the mill and adapted to be moved back and forth therethrough, means on each side of the mill for supporting said first mentioned means, said first means being adapted to receive thereon a blank having an axial seam cleft for final shaping of the latter, while moving with said first mentioned means.

JAMES V. CAPUTO.